United States Patent
Noh et al.

(10) Patent No.: US 8,378,531 B2
(45) Date of Patent: Feb. 19, 2013

(54) ACTUATOR APPARATUS OF ACTIVE ACCELERATOR PEDAL

(75) Inventors: Jongsang Noh, Ulsan (KR); Jonggeun Cha, Ulsan (KR); Donghwan Kim, Ulsan (KR)

(73) Assignee: Donghee Industrial Co., Ltd., Ulsan (KR)

( * ) Notice: Subject to any disclaimer, the term of this patent is extended or adjusted under 35 U.S.C. 154(b) by 432 days.

(21) Appl. No.: 12/786,197

(22) Filed: May 24, 2010

(65) Prior Publication Data
US 2011/0260557 A1  Oct. 27, 2011

(30) Foreign Application Priority Data
Apr. 23, 2010  (KR) .................. 10-2010-0037679

(51) Int. Cl.
*H02K 33/02* (2006.01)
*H02K 41/02* (2006.01)
*H02K 33/16* (2006.01)
*H02K 35/02* (2006.01)

(52) U.S. Cl. ............... 310/12.04; 310/12.16; 310/68 B; 74/512; 74/560

(58) Field of Classification Search ............... 310/12.04, 310/12.16, 12.32, 68 B; 74/512, 513, 514, 74/516, 560; *H02K 41/02, 33/02, 33/16, H02K 35/02*
See application file for complete search history.

(56) References Cited

U.S. PATENT DOCUMENTS

| 6,389,927 | B1 | 5/2002 | Willemsen |
| 6,862,950 | B2 | 3/2005 | O'Neill |
| 7,353,729 | B2 | 4/2008 | Willemsen et al. |
| 7,768,158 | B2 * | 8/2010 | Kitamura et al. ........... 310/12.04 |
| 7,770,491 | B2 * | 8/2010 | Ritter et al. ..................... 74/560 |
| 2011/0083528 | A1 * | 4/2011 | Osawa et al. .................. 74/513 |
| 2012/0137822 | A1 * | 6/2012 | Kim et al. ....................... 74/560 |

FOREIGN PATENT DOCUMENTS
JP  2003-098048 A  4/2003
JP  2007-296915 A  11/2007

* cited by examiner

*Primary Examiner* — Tran Nguyen
*Assistant Examiner* — Michael Andrews
(74) *Attorney, Agent, or Firm* — LRK Patent Law Firm

(57) ABSTRACT

The present invention relates to an actuator apparatus of an active accelerator pedal, which can provide a driver with a pressing-force rise mode or a vibration mode in accordance with the operational condition of the accelerator pedal and the traveling condition of the vehicle; therefore, it is possible to improve fuel efficiency and also help safe traveling. An actuator apparatus of an active accelerator pedal of the present invention includes: an actuator housing fixed to a pedal arm housing; a stator fixed to the actuator housing and electromagnetized by current transmitted though the control of an ECU; a carrier having one end disposed in a stator and the other end disposed toward the pedal arm through the actuator housing, and applying pressing-force to the pedal arm while protruding from the stator when current is applied to the stator; and a position sensor disposed in the actuator housing and detecting the amount of rotation of the pedal arm to determine the amount of current applied to the stator through the control of the ECU.

6 Claims, 6 Drawing Sheets

ACTUATOR APPARATUS OF ACTIVE ACCELERATOR PEDAL

BACKGROUND OF THE INVENTION

1. Field of the Invention

The present invention relates to a technology associated with an actuator apparatus of an active accelerator pedal.

2. Description of the Related Art

In general, active accelerator pedals installed in vehicles have a configuration that can implement a pressing-force rise mode and a vibration mode, in which the pressing-force mode and the vibration mode are configured to be able to select control modes with a mode selection button in vehicles.

The control mode operates in accordance with frequent or sudden operation of the accelerator pedal, which reduces fuel efficiency of vehicles, and traveling conditions of the vehicles (deviation from lanes, insufficient inter-vehicle distance, dangerous curve traveling etc.), and the control mode can be changed into the pressing-force rise mode and the vibration mode, which allows the drivers to safely drive.

An actuator requires implementation of the pressing-force rise mode and the vibration mode. An actuator of the related art, as shown in FIG. 1, includes a PMDC motor 1, a reduction gear 2, a rotary shaft 3, and a worm wheel 4. In this configuration, as motor 1 is rotated by a control signal from an ECU (Electronic Control Unit) 5, the rotational force of the motor 1 is transmitted to the worm wheel 4 through the reduction gear 2 and the rotary shaft 3, rotation of the worm wheel 4 is transmitted to a pedal arm 7 and the pedal arm 7 rotates toward the driver, such that the driver stepping on the pedal 7 can feel the pressing-force corresponding to the pressing-force rise mode or the vibration mode.

The actuator of an active accelerator pedal described above, however, has a structure transmitting power through a gear mechanism including the multistage gear 2, the rotary shaft 3, and the worm wheel 4, such that loss of power is large in transmitting the power and this may deteriorate the product quality.

Further, the actuator of the related art described above make a loud operational noise.

SUMMARY OF THE INVENTION

It is an object of the present invention to provide an actuator apparatus of an active accelerator pedal that makes it possible to improve reliability of product by quality problems due to loss of transmitted power, remove operational noise, and implement a compact structure by simplifying the structure.

An actuator apparatus of an active accelerator pedal includes: an actuator housing fixed to a pedal arm housing; a stator fixed to the actuator housing and electromagnetized by current transmitted through the control of an ECU; a carrier having one end disposed in a stator and the other end disposed toward the pedal arm through the actuator housing, and applying pressing-force to the pedal arm while protruding from the stator when current is applied to the stator; and a position sensor disposed in the actuator housing and detecting the amount of rotation of the pedal arm to determine the amount of current applied to the stator by the control of the ECU.

The stator includes: stator cores separably combined with the actuator housing; and a coil wound around the stator cores and receiving current by the control of the ECU.

The carrier includes: a shaft disposed movably through the actuator housing, using a bush; a carrier core integrally formed with one end of the shaft disposed in the coil; and permanent magnets attached to the carrier core such that the north pole and the south pole are alternately arranged.

The actuator apparatus of an active accelerator pedal further includes a shaft-fixing assembly that is disposed in the pedal arm housing to be in contact with the shaft protruding through the actuator housing and restricts movement of the shaft, when current is not applied to the stator.

The shaft-fixing assembly includes: a fixing case fixed to the pedal arm housing at a side of the shaft protruding through the actuator housing; a fixing pin disposed movably along a guide channel of the fixing case, with the front end protruding through the fixing case in contact with the shaft; and a spring having both ends supported by the fixing case and the fixing pin and providing elastic force to the fixing pin such that the front end of the fixing pin is kept being in contact with the shaft.

Further, a pin insertion groove to insert the front end of the fixing pin when current is not applied to the stator is integrally formed to have a semicircular cross section on the circumference of the shaft protruding through the actuator housing.

An actuator apparatus of an active accelerator pedal according to the present invention can provide a driver with a pressing-force rise mode or a vibration mode in accordance with the operational condition of the accelerator pedal and the traveling condition of the vehicle; therefore, it is possible to improve fuel efficiency and also help safe traveling. Further, since the actuator apparatus is configured to provide reacting force to the pedal arm by using a magnetic field, a loss of power is small when power is transmitted in comparison to configurations using a gear mechanism in the related art, such that it is possible to improve product quality by achieving accurate operation. In addition, the actuator apparatus is configured to make less operational noise, such that it can improve quality satisfaction of consumers.

DETAILED DESCRIPTION OF THE PREFERRED EMBODIMENTS

Hereinafter, embodiments of the present invention will be described in detail with reference to the accompanying drawings.

Figure 1:
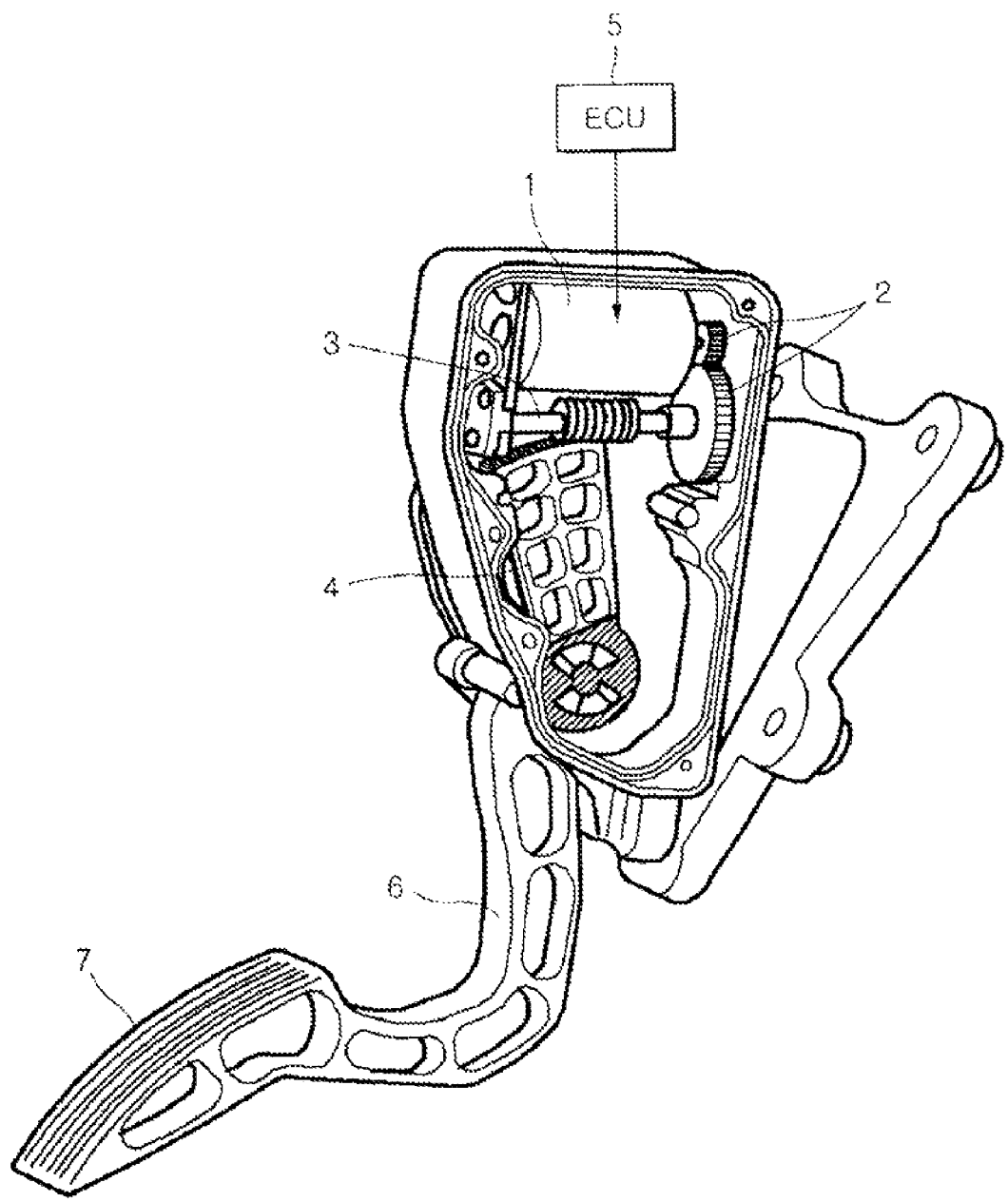
FIG. 1 is a view illustrating an actuator apparatus of an active accelerator pedal in the related art.
Figure 2:
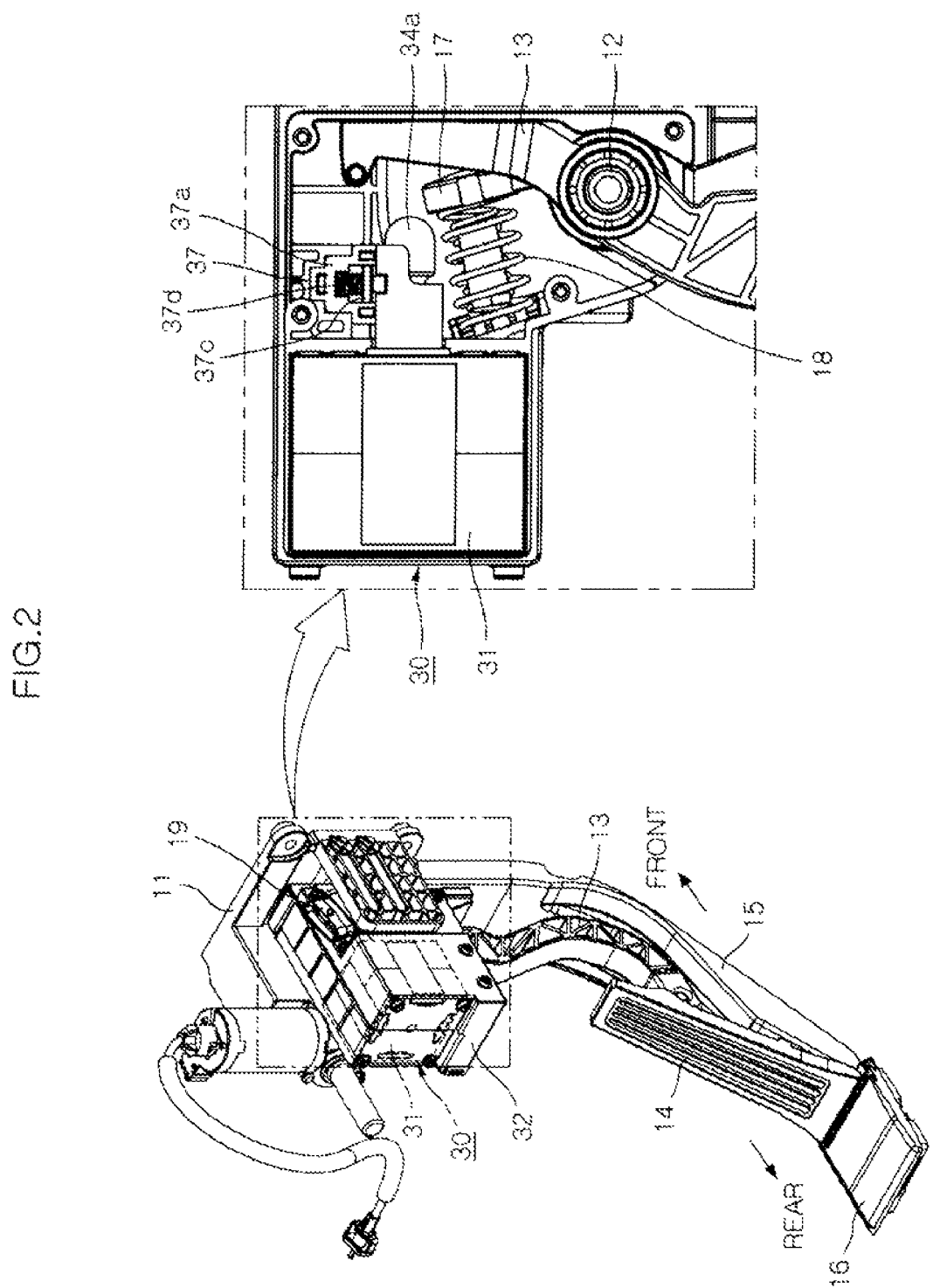
FIG. 2 is a view showing an active accelerator pedal equipped with an actuator apparatus according to the present invention.
Figure 3:
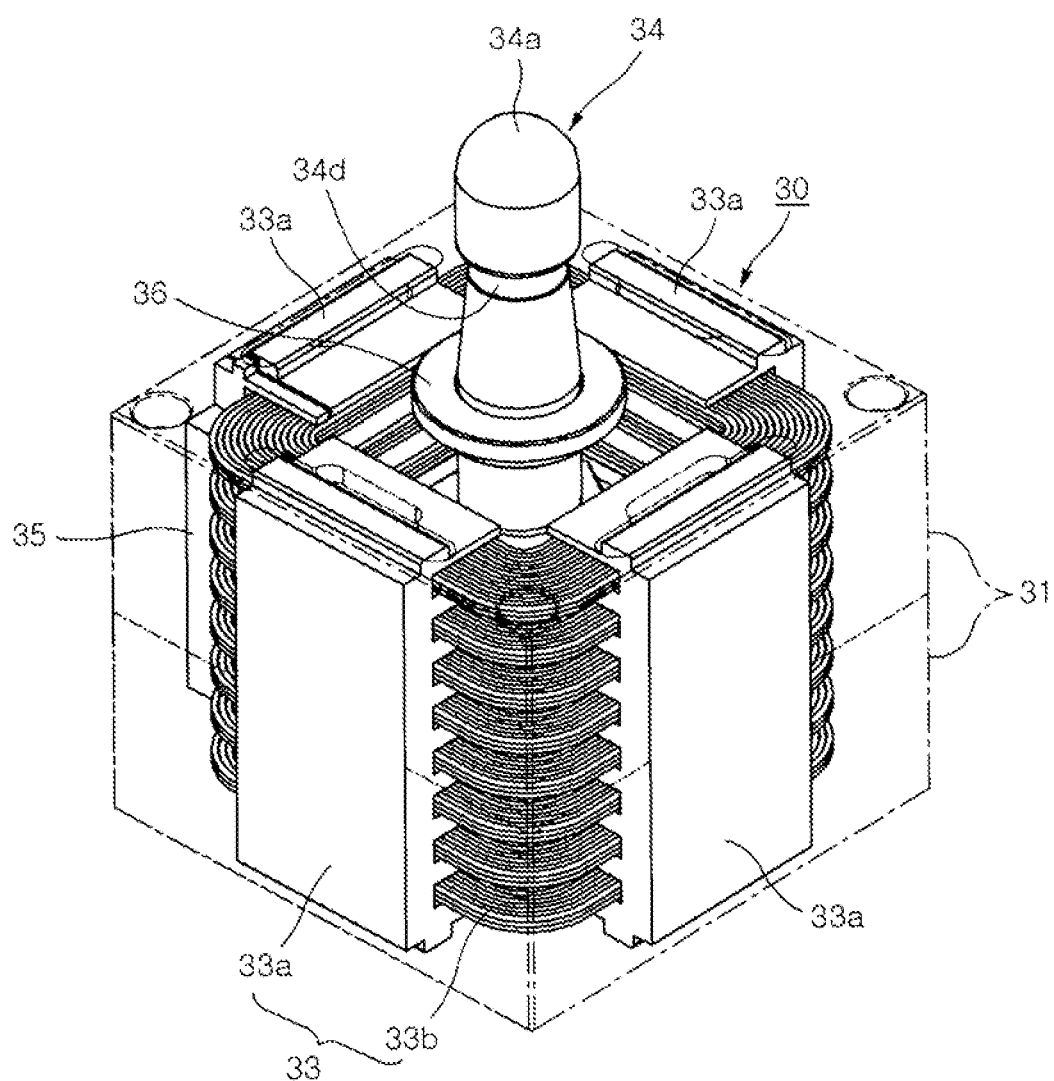
FIGS. 3 to 5 are perspective view, a plan view, and an exploded perspective view illustrating an assembled actuator apparatus according to the present invention, respectively.
Figure 4:
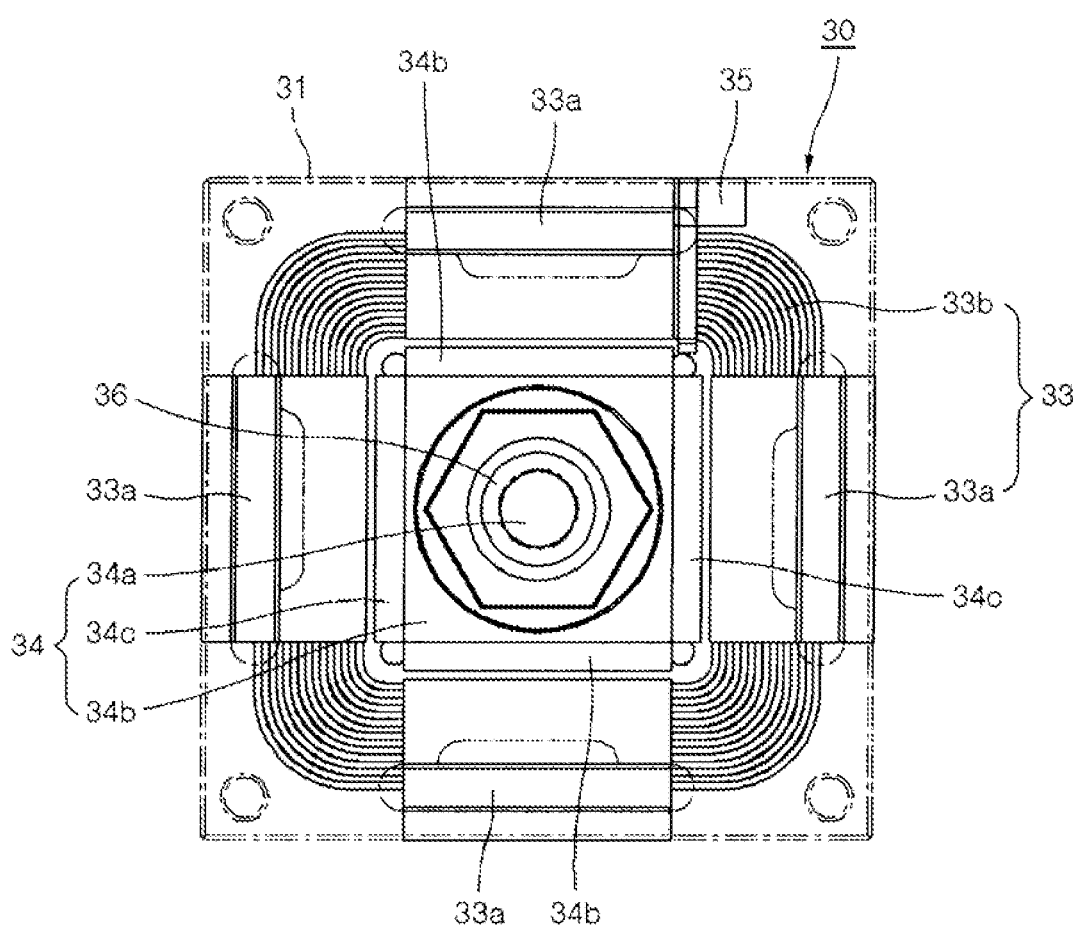
Figure 5:
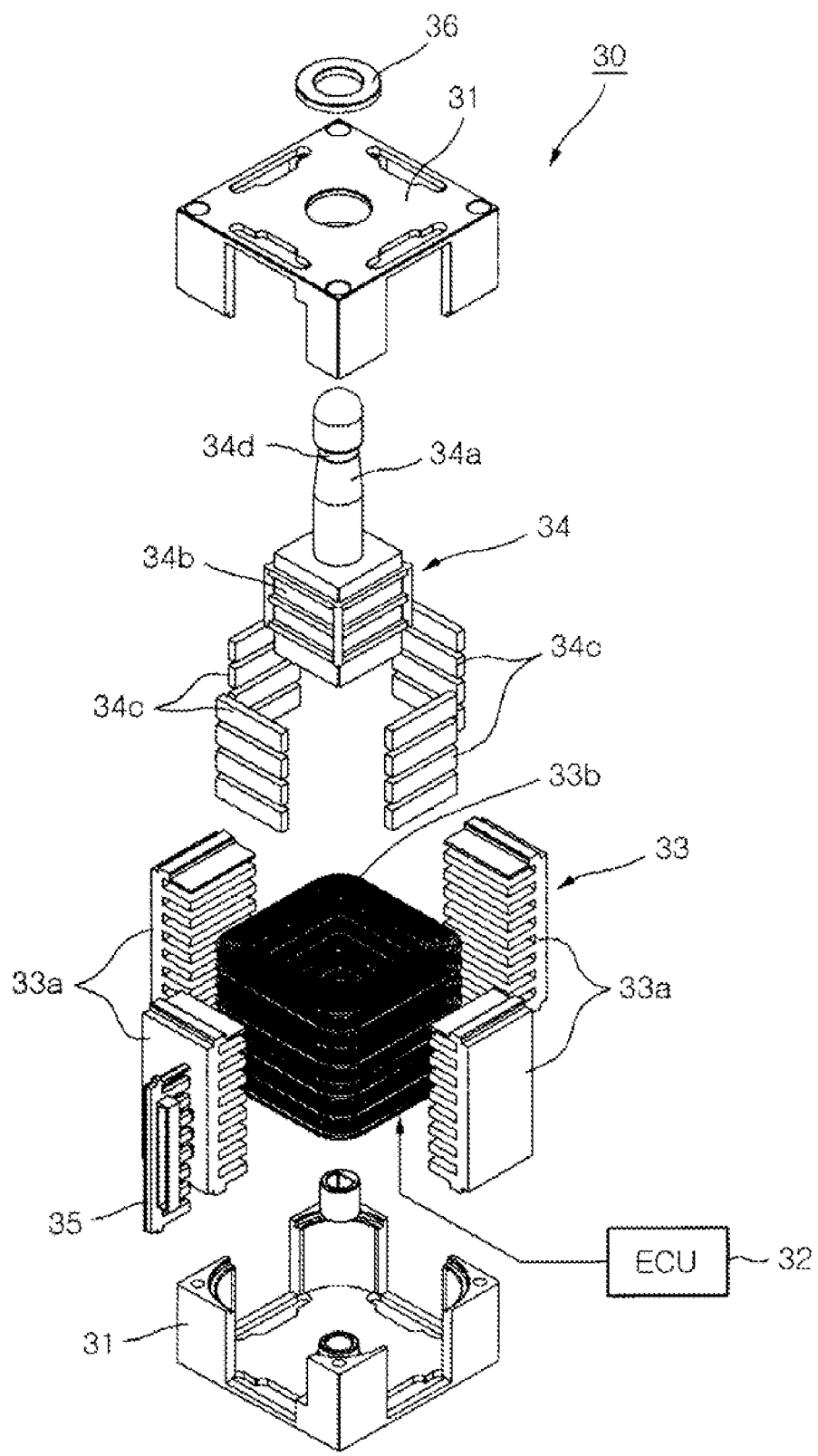
Figure 6:
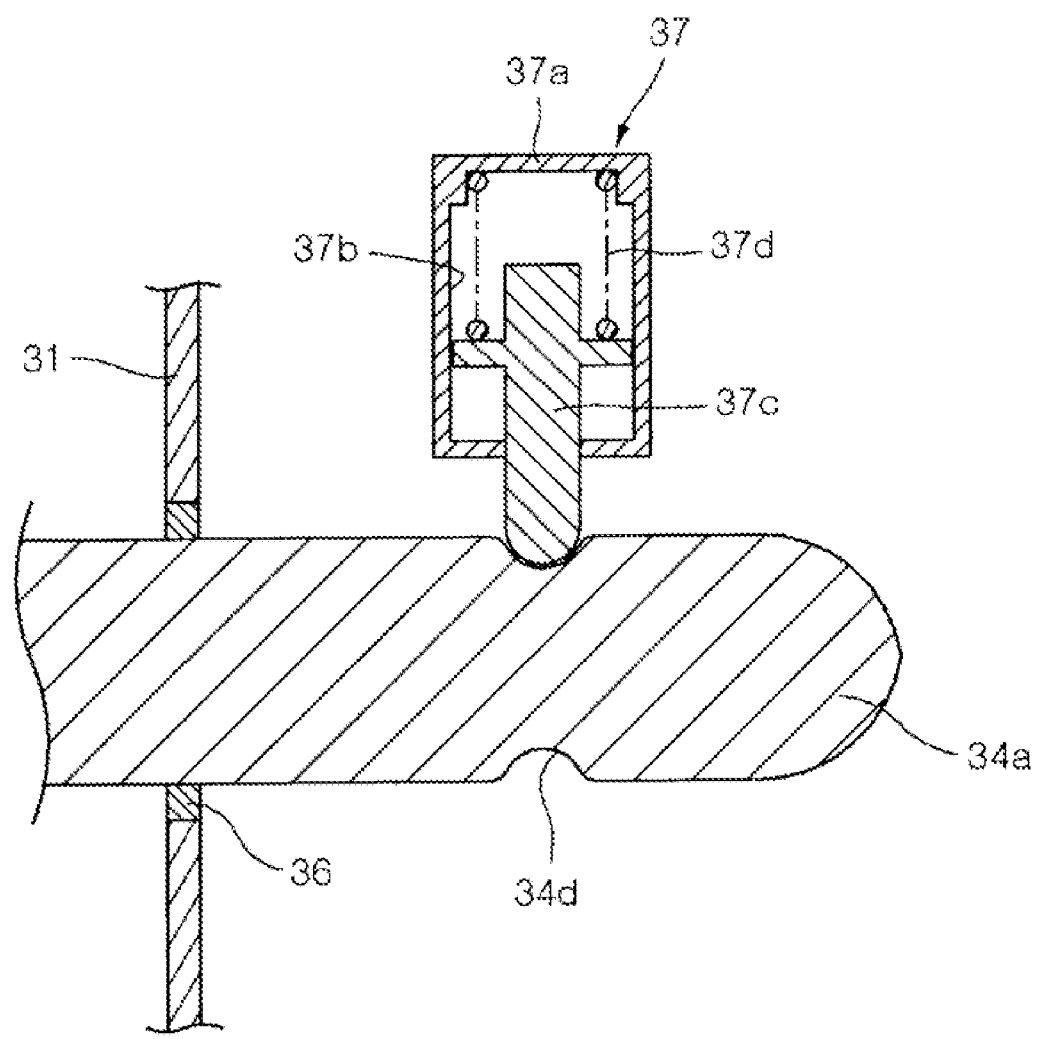
FIG. 6 is a view illustrating a shaft-fixing assembly according to the present invention.

Although a pendant type active accelerator pedal is shown as an example of the present invention in FIG. 2, the present invention is not limited thereto and may use an organ type, if needed.

The pendant type active accelerator pedal includes: a pedal arm housing 11 fixed to the dash panel under the driver's seat, a pedal arm 13 rotatably connected to the pedal arm housing 11 by a hinge shaft 12, and a pedal 14 hinged to the end of the pedal arm 13.

The upper end of a slider 15 is rotatably connected to the pedal arm housing 11 and the lower end of a pedal 14 is rotatably hinged to the lower end of the slider 15.

A guide block 16 is fixed to the floor panel under the driver's seat and the lower end of the slider 15 is connected to the guide block 16, movable forward/backward with respect to the car body.

Further, the accelerator pedal has a structure in which a spring seat 17 is provided in the pedal arm 13 disposed in the pedal arm housing 11, the lower end of a pedal arm spring 18 is placed in the spring seat 17, and the upper end of the pedal arm spring 18 is supported against the pedal arm housing 11, such that as the pedal arm spring 18 is restored, the pedal arm 13 returns to the initial position.

The pendant type active accelerator pedal has an electronic configuration that can improve operational feel and reduce fatigue and improve fuel efficiency by reducing fuel consumption, and for this configuration, a sensor 19 is fixed to the pedal housing 11 and connected with the pedal arm 13 disposed in the pedal housing 11 through a sensor lever (not shown).

Therefore, as the driver presses down the pedal 14 and the pedal arm 13 correspondingly rotates, the sensor 19 detects changes in output value according to the rotation of the sensor lever connected to the pedal arm 13 and sends an electric signal to a throttle control unit. The throttle control unit drives the actuator to open/close a throttle valve in response to the control signal, thereby adjusting the amount of combustion.

Meanwhile, an actuator apparatus 30 of an active accelerator pedal according to the present invention, as shown in FIGS. 2 to 6, includes: an actuator housing 31 fixed to the pedal arm housing 11; a stator 33 fixed to the actuator housing 31 and electromagnetized by current transmitted through the control of the ECU (Electronic Control Unit) 32; a carrier 34 having one end disposed in the stator 33 and the other end disposed toward the pedal arm 13 through the actuator housing 31, and applying pressing-force to the pedal arm while protruding from the stator 33 when current is applied to the stator 33; and a position sensor 35 disposed in the actuator housing 31 and detecting the amount of rotation of the pedal arm 13 to determine the amount of current applied to the stator 33 through the control of the ECU 32.

In this configuration, the actuator housing 31 has a dividable structure that is divided up and down.

The ECU 32 determines whether current is applied to the stator 33, in response to signal transmitted from various sensors in accordance with frequent or sudden operation, which deteriorates fuel efficiency, and traveling conditions of the vehicle (deviation from lanes, insufficient inter-vehicle distance, dangerous curve traveling etc.), and also determines the amount of current applied to the stator 33 in response to a signal detected by position sensor 35.

The position sensor 35 is a hole sensor having a hole element.

Further, the stator 33 is composed of the stator cores 33a separably combined with the actuator housing 31 and a coil 33b wound around the stator cores 33a and receiving current through the control of the ECU 32.

The stator cores 33a have grooves to wind the coil 33b.

The carrier 34 is composed of a shaft 34a disposed movably through the actuator housing 31, using a bush 36, a carrier core 34b integrally formed with one end of the shaft 34a disposed in the coil 33b, and permanent magnets 34 attached to the carrier core 34c such that the north pole and the south pole are alternately arranged.

Meanwhile, the actuator apparatus 30 of an active accelerator pedal according to the present invention further includes a shaft-fixing assembly 37 that is disposed in the pedal arm housing 11 to be in contact with the shaft 34a protruding through the actuator housing 31 and restricts free movement of s the haft 34a, when current is not applied to the stator 33.

The shaft-fixing assembly 37 is composed of a fixing case 37a fixed to the pedal arm housing 11 at a side of the shaft 34a protruding through the actuator housing 31, a fixing the pin 37c disposed movably along a guide channel 37b of the fixing case 37a, with the front end protruding through the fixing case 37a in contact with the shaft 34a, and a spring 37d having both ends supported by the fixing case 37a and the fixing pin 37c and providing elastic force to the fixing pin 37c such that the front end of the fixing pin 37c is kept being in contact with the shaft 34a.

A pin insertion groove 34d to insert the front end of the fixing pin 37c when current is not applied to the stator 33 is formed on the circumference of the shaft 34a protruding through the actuator housing 31, in which the pin insertion groove 34d has a semicircular cross section integrally formed around the circumference of the shaft 34a.

The operation of the embodiment of the present invention is described hereafter.

When frequent or sudden operation of the accelerator pedal is repeated by the wrong habits of the driver driving a vehicle, causing the vehicle to unstably travel, such as deviation from a lane, insufficient inter-vehicle distance, dangerous curve traveling etc., the ECU 32 operates such that current is applied to the coil 33b of the stator 33, in response to the information from various senses equipped in the vehicle.

When current is applied to the coil 33b, the stator core 33a is electromagnetized and generates a magnetic field, in accordance with the magnetic field, the carrier 34 is linearly protruded through the stator 33 by the polarity of the permanent magnets 34c.

As the carrier 34 protrudes through the stator 33, the shaft 34a further protrudes through the actuator housing 31 and the front end of the shaft 34a contacts with the pedal arm 13 and the pedal arm 13 that has been rotated counterclockwise about the hinge shaft 12 from the position shown in FIG. 2 by the force of the driver pressing down the pedal 14 receives force to rotate clockwise by reacting force of the shaft 34a.

Accordingly, the driver receives the reacting force of the shaft 34a through the pedal 14 and stop unnecessary operation of the pedal 14, such that an eco-mode helping improve fuel efficiency can be implemented and the vehicle can stably travel.

On the other hand, the protrusion amount of the carrier 34 through the stator 33 when current is applied to the coil 33b is proportional to the rotational amount of the pedal arm 13, that is, when the pedal arm 13 has rotated a lot (large rotational amount counterclockwise about the hinge shaft 12 from the position shown in FIG. 2), the protrusion amount of the carrier 34 is small, whereas when the pedal arm 13 has rotated a little, the protrusion amount of the carrier 34 is large.

This is reason the shaft 34a linearly applies reacting force to the pedal arm 13, such that the position sensor 35 determines the protrusion amount of the carrier 34 according to the rotational amount of the pedal arm 13.

That is, the position sensor 35 detects the rotational amount of the pedal arm 13 and transmits a corresponding signal to the ECU 32 and the ECU 32 determines the amount of current to transmit to the coil 33b of the stator 33 in response to the signal transmitted from the position sensor 35. The ECU 32 controls the magnitude of current applied to the coil 33b in accordance with the position (protrusion amount) of the carrier 34 such that the carrier 34 can generates uniform propelling force in the entire section where the carrier 34 moves.

Further, when the ECU 32 rapidly and repeatedly changes the polarity of the current applied to the coil 33b, the carrier 34 repeatedly protrudes and retreats through the stator 33, such that the reacting force applied to the pedal arm 13 from the shaft 34a is changed to the vibration mode. Accordingly, the driver recognizes an unstable traveling condition (deviation from a lane, insufficient inter-vehicle distance, dangerous curve traveling etc.) from the vibration transmitted through the pedal 14 and accordingly he/she does not operate the accelerator pedal any further, thereby safely driving the vehicle.

As described above, an actuator apparatus 30 of an active accelerator pedal according to the present invention can provide a driver with a pressing-force rise mode or a vibration mode in accordance with the operational condition of the accelerator pedal and the traveling condition of the vehicle; therefore, it is possible to improve fuel efficiency and also help safe traveling.

Further, since the actuator apparatus 30 according to the present invention is configured to provide reacting force to the pedal arm 13, using a magnetic field, the loss of power is small when power is transmitted in comparison to configurations using a gear mechanism in the related art, such that it is possible to improve product quality by achieving accurate operation.

Further, the actuator apparatus 30 according to the present invention is configured to make less operational noise, such that it can improve quality satisfaction of consumers.

Further, since the actuator 30 according to the present invention is simplified in structure, as compared with the configurations of the related art using a gear mechanism, it is possible to achieve a compact configuration.

What is claimed is:

1. An actuator apparatus of an active accelerator pedal, comprising:
   an actuator housing fixed to a pedal arm housing;
   a stator fixed to the actuator housing and electromagnetized by current transmitted through the control of an ECU;
   a carrier having one end disposed in the stator and the other end disposed toward the pedal arm through the actuator housing, and applying pressing-force to the pedal arm while protruding from the stator when current is applied to the stator; and
   a position sensor disposed in the actuator housing and detecting the amount of rotation of the pedal arm to determine the amount of current applied to the stator through the control of the ECU.

2. The actuator apparatus of an active accelerator pedal according to claim 1, wherein the stator includes:
   stator cores separably combined with the actuator housing; and
   a coil wound around the stator cores and receiving current through the control of the ECU.

3. The actuator apparatus of an active accelerator pedal according to claim 2, wherein the carrier includes:
   a shaft disposed movably through the actuator housing, using a bush;
   a carrier core integrally formed with one end of the shaft disposed in the coil; and
   permanent magnets attached to the carrier core such that the north pole and the south pole are alternately arranged.

4. The actuator apparatus of an active accelerator pedal according to claim 3, further comprising a shaft-fixing assembly that is disposed in the pedal arm housing to be in contact with the shaft protruding through the actuator housing and restricts free movement of the shaft, when current is not applied to the stator.

5. The actuator apparatus of an active accelerator pedal according to claim 4, wherein the shaft-fixing assembly includes:
   a fixing case fixed to the pedal arm housing at a side of the shaft protruding through the actuator housing;
   a fixing pin disposed movably along a guide channel of the fixing case, with the front end protruding through the fixing case in contact with the shaft; and
   a spring having both ends supported by the fixing case and the fixing pin and providing elastic force to the fixing pin such that the front end of the fixing pin is kept from being in contact with the shaft.

6. The actuator apparatus of an active accelerator pedal according to claim 5, wherein a pin insertion groove to insert the front end of the fixing pin when current is not applied to the stator is integrally formed to have a semicircular cross section on the circumference of the shaft protruding through the actuator housing.

* * * * *